March 18, 1924.

F. O. JAQUES, JR

LATHE TOOL

Filed July 13, 1923

1,487,681

INVENTOR:
Fernando Oscar Jaques, Jr.,
By Chas. H. Luther
ATTORNEY.

Patented Mar. 18, 1924.

1,487,681

UNITED STATES PATENT OFFICE.

FERNANDO OSCAR JAQUES, JR., OF PROVIDENCE, RHODE ISLAND.

LATHE TOOL.

Application filed July 13, 1923. Serial No. 651,378.

*To all whom it may concern:*

Be it known that I, FERNANDO OSCAR JAQUES, Jr., a citizen of the United States, residing at Providence, in the county of Providence and State of Rhode Island, have invented a new and useful Improvement in Lathe Tools, of which the following is a specification.

My invention has reference to an improvement in machine tools and more particularly to an improvement in lathe tools such as shown in United States Patent No. 1,034,367, Lathe tool, granted to me July 30, 1912.

In the use of lathe tools and the like in machine shop practice of to day the best and most costly metal is used for obvious reasons, in the part or member of the tool that actually does the cutting or work of the tool.

The object of my invention is to improve the construction of a lathe tool having incorporated therein a zigzag cutting member capable of being reversed and producing in succession a series of cutting points.

A further object of my invention is to provide a lathe tool having a zigzag reversible cutting member capable of producing a plurality of cutting points and formed of costly high speed steel, stelite or the like, whereby the cost of manufacturing the lathe tool is greatly reduced and the lathe tool as a whole is materially improved.

My invention consists in the peculiar and novel construction of a lathe tool having a reversible zigzag cutting member capable of being formed into a plurality of cutting points, a holding member and means for adjustably and rigidly securing the reversible zigzag cutting member in the holding member, said lathe tool having details of construction, as will be more fully set forth hereinafter and claimed.

Figure 1:
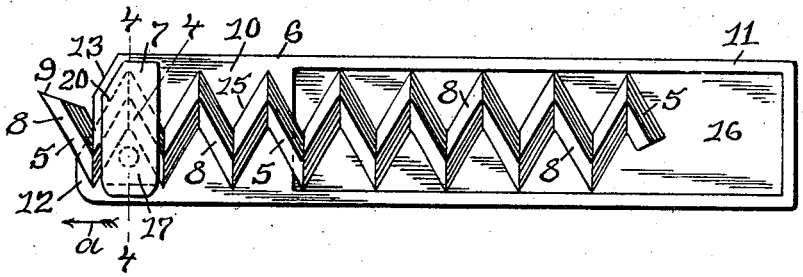
Figure 1 is a side view of my improved lathe tool.

In the drawing 5 indicates the reversible zigzag cutting tool member, 6 the holding member and 7 the clamping member of my improved lathe tool.

Figure 2:
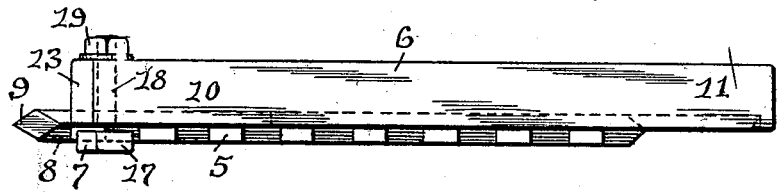
Figure 2 is a top plan view of the lathe tool.

The zigzag shaped cutting member 5, as shown, is in the form of a square bar formed with a succession of sharp turnings or angles each turning or angle forming a cutting member 8, which when in use, is ground to form a cutting point 9, as shown in Figures 1 and 2.

Figure 3:
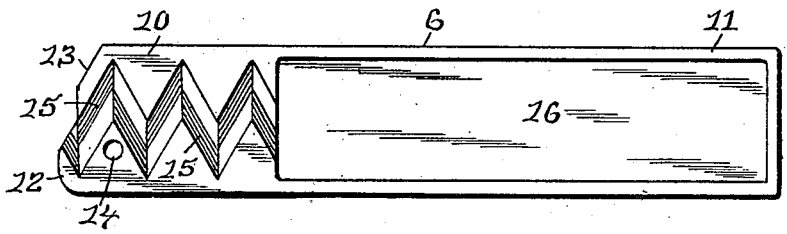
Figure 3 is a side view similar to Figure 1 with the reversible zigzag cutting member and clamping member removed.

The holding member 6 has a clamping end 10 and a shank 11. The clamping end 10 has a protruding forward end 12, an inclined portion 13, a transverse bolt hole 14 and a zigzag groove 15 corresponding to the zigzag shape of the cutting member 5 and into which the cutting member 5 fits. This zigzag groove 15 extends from the protruding end 12 to a recess 16 formed in the side of the holding member 6, as shown in Figure 3.

Figure 4:
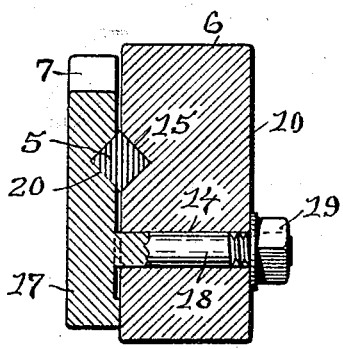
Figure 4 is an enlarged transverse sectional view through the lathe tool taken on line 4, 4 of Figure 1 and looking in the direction of the arrow *a*.

The clamping member 7 has a rectangular shaped clamping head 17 on which is a screw-threaded stem 18 which extends through the bolt hole 14 and has a nut 19 bearing against the holding member 6, as shown in Figure 4. On the back of the clamping head 17 is a zigzag groove 20 corresponding to the zigzag shape of the cutting member 5, as shown in broken lines in Figure 1.

When in use the zigzag cutting member 5 is rigidly secured in the grooves in the holding member 6 by tightening the nut 19. When a cutting member 8 is worn down the zigzag cutting member 5 is removed from the holding member 6, reversed and again rigidly secured in the holding member 6 with the next cutting member 8 protruding. The end of the cutting member 8 is then sharpened by grinding and the tool is again ready for use and this may be repeated again and again or until all of the cutting members 8, 8 are used up.

I do not confine myself to the shape of the zigzag cutting member, as this may be round, diamond, oval or any other shape in cross section and other details of construction may be varied within the scope of the appended claims.

Having thus described my invention I claim as new:—

1. A lathe tool comprising a zigzag shaped cutting member, a holding member having a corresponding zigzag shaped groove and means for rigidly securing the zigzag shaped cutting member in the zigzag shaped groove of the holding member.

2. A lathe tool comprising a zigzag shaped cutting member, a holding member having a head portion and a shank portion, a corresponding zigzag shaped groove in the head portion of the holding member and means for rigidly securing the zigzag shaped cutting member in the zigzag shaped groove in the head portion of the holding member.

3. A lathe tool comprising a reversible zigzag shaped cutting member formed with a succession of sharp turnings or angles and having a cutting point, a holding member having a shank portion and a head portion in which is a corresponding zigzag shaped groove and means for rigidly securing the zigzag shaped cutting member in the zigzag shaped groove in the head portion of the holding member.

4. A lathe tool comprising a reversible zigzag shaped cutting member formed with a succession of sharp turnings or angles, each turning or angle forming a member capable of being formed into a cutting member with a cutting point, a holding member having a shank portion and a head portion in which is a corresponding zigzag groove and means for rigidly securing the zigzag shaped cutting member in the zigzag shaped groove in the head portion of the holding member.

5. A lathe tool comprising a reversible zigzag shaped cutting member having a cutting point, a holding member having a shank in which is a recess, a head end with a protruding portion, a corresponding zigzag shaped groove in the head end and a transverse bolt hole in the head end, a clamping member having a clamping head in which is a corresponding zigzag shaped groove, a screw-threaded stem on the clamping head and which extends through the bolt hole in the holding member and on which is a nut bearing against the holding member, for the purpose as described.

In testimony whereof, I have signed my name to this specification.

FERNANDO OSCAR JAQUES, Jr.